DEFLECTION SYSTEM WITH LINEARITY CORRECTION NETWORK

Filed March 22, 1967

Inventor
WILLIAM E. DRUMMOND
BY Mueller, Aichele & Rauner
ATTYS.

United States Patent Office 3,439,221
Patented Apr. 15, 1969

3,439,221
DEFLECTION SYSTEM WITH LINEARITY CORRECTION NETWORK

William Eric Drummond, Stanford, Calif., assignor to Motorola, Inc., Franklin Park, Ill., a corporation of Illinois Filed Mar. 22, 1967, Ser. No. 625,221
Int. Cl. H01j *29/70*
U.S. Cl. 315—27 10 Claims

ABSTRACT OF THE DISCLOSURE

A sawtooth wave is applied to an amplifier circuit and a positive feedback circuit converts a portion of the amplified output into a parabolic wave to add to the sawtooth wave. Low frequency components of the parabolic sawtooth signal are attenuated, and higher frequency components are passed, by another positive feedback circuit to develop a current waveform through the deflection yoke to provide linear sawtooth scan of the cathode ray beam.

*Background of the invention*

Television receivers include a vertical deflection system which is synchronized with the vertical frequency of a transmitted television signal to develop and apply a sawtooth current waveform through a vertical yoke. The waveform generally comprises a slowly increasing current commonly referred to as the trace portion during which time the cathode ray beam is swept across the face of the tube for conveying the picture information, and a rapidly decreasing current commonly referred to as the retrace portion during which time the picture tube is blanked out. In order to insure accurate reproduction of the transmitted picture, it is essential that the current in the yoke during trace be linear, except for the extremities which should be flattened to compensate for the fact that the screen of the cathode ray tube is not spherical.

To counteract the non-linear characteristics of the transformer which couples the sawtooth current waveform to the yoke, such waveform must have a selected non-linear shape. In tube circuits, this may be achieved by utilizing the non-linear transfer characteristic of the vertical output tube. However, the transfer characteristic of a transistor having some degeneration is relatively linear so that if a linear sawtooth waveform is applied, a similar waveform would be developed and then distorted by the coupling transformer so as to cause non-linear scan.

Certain prior art circuits have attempted to solve this problem but have not been entirely successful in developing the exact shape necessary. For example, a simple feedback circuit which converts a portion of the sawtooth into a parabola has not provided adequate linearity. Also, negative feedback networks have been proposed which, although providing some linearity improvement, reduce available deflection power.

*Summary of the invention*

It is, therefore, an object of this invention to provide a deflection system for a television receiver which is capable of producing a substantially linear sawtooth current in the deflection yoke.

Another object is to provide a television receiver vertical deflection system with a pair of positive feedback circuits to improve linearity with a minimum loss in deflection power.

Another object is to permit use of transistors in vertical deflection systems without introducing non-linearities in the picture scan.

In a specific embodiment, the vertical deflection system according to the invention includes a transistor or set of cascaded transistors and an amplified representation of a sawtooth wave signal applied to the input electrode is derived at the output electrode and coupled through a first positive feedback circuit which integrates the amplified representation and derives parabolic components in phase therewith. The parabolically shaped sawtooth signal, after amplification by the transistors, appears at the output electrode. A second positive feedback circuit includes a high pass filter to attenuate the low frequency components and pass the higher frequency components of the latter mentioned signal and to apply the same to the input electrode. The amplified version of the parabolic sawtooth signal having attenuated low frequency components is applied through a transformer which has non-linear characteristics to the vertical deflection yoke. The said characteristics are such as to convert the last mentioned signal into a substantially linear sawtooth current through the yoke.

*Description of the preferred embodiment*

Figure 1:
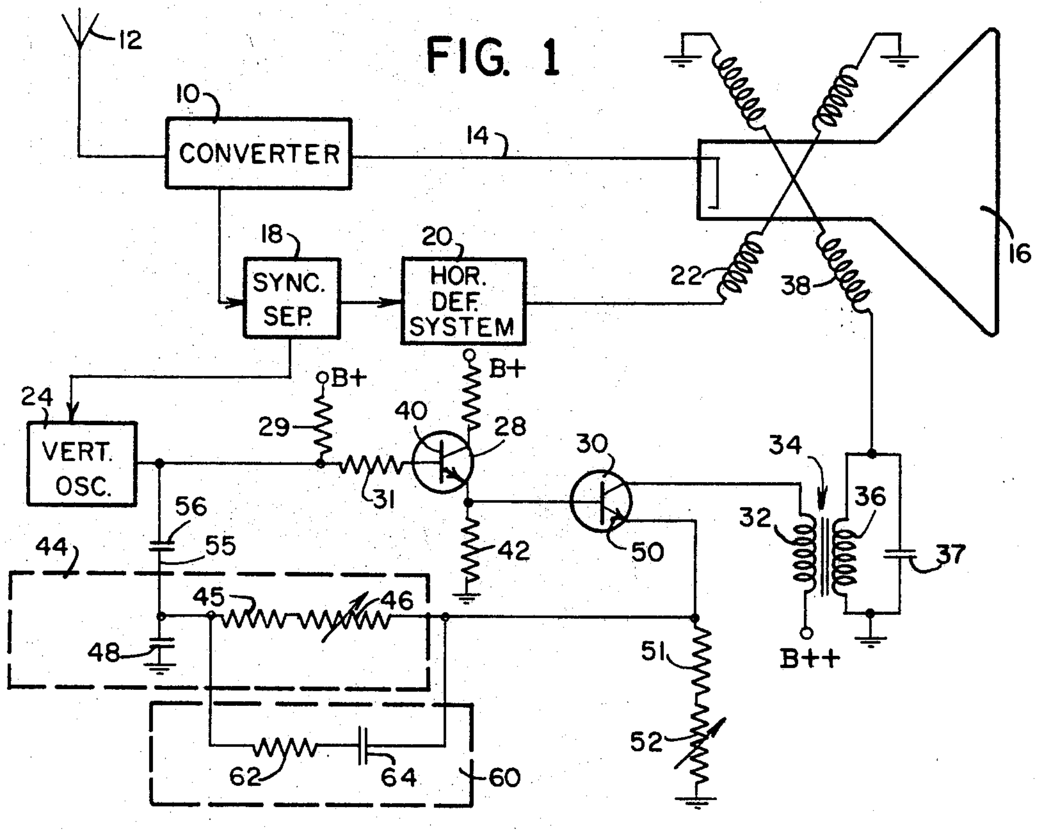
FIG. 1 illustrates a television receiver partially in block and partially in schematic incorporating the features of the invention.

Referring now to FIG. 1, the television receiver therein shown includes a converter 10 which may be of known construction for receiving radio frequency signals at antenna 12 and converting the same into video signals on conductor 14 for application to cathode ray tube 16. A synchronizing signal separator circuit 18 is coupled to converter 10 to derive horizontal synchronizing pulses for application to horizontal deflection system 20 which in turn applies a sawtooth wave current through horizontal deflection yoke 22. In addition, the horizontal deflection system includes means to provide high voltage for the final anode of cathode ray tube 16.

Synchronizing signal separator circuit 18 also provides vertical synchronizing pulses for application to vertical oscillator 24. The vertical oscillator 24 develops a synchronized vertical sawtooth waveform 26, shown in FIG. 2, which is then amplified by a driver transistor 28 and an output transistor 30. Bias for transistor 28 is provided through resistors 29 and 31 from B+. The amplified sawtooth wave signal appearing across the primary winding 32 of a transformer 34 is coupled to its secondary winding 36 for application to vertical deflection yoke 38 to cause a sawtooth current to flow therethrough for vertical scan of the cathode ray beam. Capacitor 37 across the secondary 36 permits adjustment of the retrace time for current through yoke 38. In order to provide a linear transfer characteristic, and eliminate effects of transistor parameter variations, it is preferable that the transistors have some degeneration in the form of a resistor 42 connected to the emitter of transistor 28 and a load impedance consisting of resistor 51 and potentiometer 52 connected in series between the emitter 50 of transistor 30 and ground. Potentiometer 52 is variable to permit size adjustment by adjusting the peak-to-peak amplitude of the current waveform through primary winding 32. Resistor 51 insures a sufficient load resistance for developing a feedback voltage even with a minimum setting of potentiometer 52.

Figure 2:
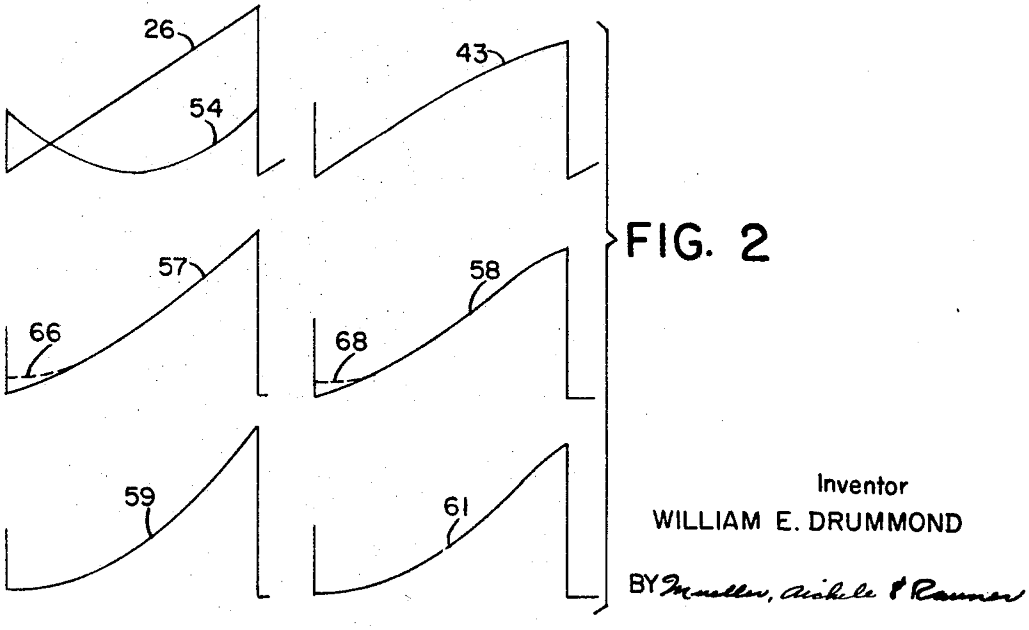
FIG. 2 illustrates waveforms useful in explaining the operation of the invention.

The linear sawtooth driving waveform 26 of FIG. 2 is applied to the base 40 of transistor 28 and since linear amplification is provided by transistors 28 and 30, this also represents the current waveform through primary winding 32. Due to the saturation characteristics of the transformer 34, the current through the yoke 38, as shown by the waveform 43 of FIG. 2, has a "flattened" terminal portion. Since the shape of the screen of cathode ray tube 16 is not spherical, current through the yoke 38 should have a symmetrically expanded S shape, or in other words, linear during the middle of scan and flattened at the extremities. But note that in waveform 43, the initial portion or beginning of scan remains linear so that the top of the picture will be expanded and the bottom will be contracted. The object then is to predistort the sawtooth waveform before it is applied to the transformer 34 to flatten or reduce the slope of this initial portion.

The predistortion is effected by a first positive feedback circuit 44 which includes a resistor 45, a potentiometer 46 and a capacitor 48 connected in series between the emitter 50 of transistor 30 and ground. The waveform 26 not only represents the current through primary winding 32, but also the voltage waveform across the load resistance consisting of resistor 51 and potentiometer 52. The voltage waveform 26 appears at emitter 50 and is integrated by feedback circuit 44 to create parabolic components 54 on conductor 55. Optimum linearity is attained by adjusting the potentiometer 46 to vary the amount of integration by circuit 44.

It is known that the signal on an emitter of a transistor follows the signal on its base so that a signal applied to base 40 provides an in-phase signal on emitter 50. Components 54 are coupled through a capacitor 56 to base 40 and due to this in-phase relationship, these components add to the linear sawtooth waveform 26 to cause a parabolic sawtooth current 57 to flow through primary winding 32. The yoke current waveform 58 has its terminal portion flattened by transformer 34, but still more than the initial portion. It may appear that to remedy this, the "amount" of parabola may be increased so that the waveform 59 is applied to base 40 of transistor 28. However, this not only affects the initial portion of the yoke current, but, also, as can be seen by the waveform 61, the yoke current during the entire first half of scan changes more slowly than the second half so that now the picture will be expanded at the bottom of scan and contracted at the top. Thus, increasing the parabola is not the answer to improving linearity.

The waveform 57 which represents the voltage on emitter 50 has low frequency components during its initial portion where the slope is low with the frequency and slope increasing as the terminal portion is approached. In order to utilize this frequency characteristic, a second positive feedback circuit 60 which includes a resistor 62 and a capacitor 64 are coupled in series between emitter 50 and conductor 55. Circuit 60 acts as a high pass filter whereby lower frequency components in waveform 57 are attenuated as shown by the dotted line 66 therein and higher frequency components are only slightly affected and passed to the junction of capacitors 48 and 56. In other words, circuit 60 shunts the positive feedback circuit 40 to provide more parabolic feedback at the beginning of scan. After processing by transformer 34, the current through yoke 38 will have the appearance of waveform 58 with the initial portion dotted as indicated by numeral 68. Now the yoke current will be linear throughout the middle portion of scan and the extremities will be flattened as shown to compensate for the non-spherical shape of the cathode ray tube screen. It should be noted that although waveform 61 and waveform 58 with the dotted position 68 have decreased slope at the beginning of scan, only the latter maintains linearity through the remainder of scan. Also, since circuits 44 and 60 both employ positive feedback, the loss in deflection power due to linearity correction is minimized.

In a particular construction the following components were used:

| | | |
|---|---|---|
| Transistor **28** (Motorola) | | M4842 |
| Transistor **30** (Motorola) | | M4900 |
| Resistor **42** | ohms | 1,000 |
| Resistor **45** | do | 2,200 |
| Potentiometer **46** | do | 0–4,000 |
| Capacitor **48** | microfarads | 2.2 |
| Resistor **51** | ohms | 10 |
| Potentiometer **52** | do | 0–15 |
| Capacitor **56** | microfarads | 2.2 |
| Resistor **62** | ohms | 4,700 |
| Capacitor **64** | microfarad | 1 |

What has been described, therefore, is a correction network for a vertical deflection system which improves scan linearity without a significant loss in deflection power.

I claim:

1. A deflection system for providing sawtooth current in a cathode ray tube deflection yoke and including in combination; transistor means having input and output electrodes, an output circuit including a load impedance coupled to said output electrode, means to apply a parabolic sawtooth wave signal to said input electrode having a predominance of low frequency content during its initial portion as compared to its terminal portion, said transistor means processing said signal to provide a corresponding parabolic sawtooth wave signal across said load impedance, a positive feedback circuit coupled between said output and input electrodes and comprising a high pass filter to attenuate low frequency component and pass higher frequency components, said output circuit including circuit means coupling said transistor means to the deflection yoke to apply said parabolic sawtooth signal having attenuated low frequency components thereto.

2. A deflection system for providing sawtooth current in a cathode ray tube deflection yoke and including in combination; transistor means having input and output electrodes, an output circuit including a load impedance coupled to said output electrode, means to apply a sawtooth wave signal to said input electrode, said transistor means processing said signal to provide a correpsonding sawtooth wave signal across said load impedance, means to inject parabolic components into the sawtooth wave signal so that a parabolic sawtooth signal is developed across said load impedance which has a predominance of low frequency content during its initial portion as compared to its terminal portion, a high pass filter coupled between said input and output electrodes to attenuate low frequency components and pass higher frequency components, said output circuit including circuit means coupling said transistor means to the deflection yoke to apply said parabolic sawtooth signal having attenuated low frequency components thereto, said circuit means converting said last mentioned signal into a substantially linear sawtooth current through the yoke.

3. The deflection system of claim 2 wherein said positive feedback circuit includes series coupled resistance and capacitance means.

4. The deflection system according to claim 2 wherein said means to inject parabolic components comprises a positive feedback circuit coupled between said input and output electrodes which integrates the sawtooth signal across said load impedance to derive said parabolic components.

5. A vertical deflection system for providing a sawtooth current in a cathode ray tube vertical deflection yoke and including in combination; transistor means having input and output electrodes, an output circuit including an impedance coupled to said output electrode, means to apply a sawtooth wave signal to said input electrode, said transistor means processing said signal to provide a corresponding sawtooth wave signal across said load impedance, a first positive feedback circuit coupled between said input and output electrodes to integrate said sawtooth wave signal and derive parabolic signal components for in-phase combination with said sawtooth wave signal to derive a parabolic sawtooth signal having greater low frequency content during its initial portion than during its terminal portion, said parabolic sawtooth signal being processed by said transistor means to appear across said load impedance, a second positive feedback circuit coupled between said input and output electrodes comprising a high pass filter to attenuate said low frequency components, said output circuit including circuit means to couple said transistor means to the deflection yoke and apply said parabolic sawtooth signal having attenuated low frequency components thereto, said circuit means converting said parabolic sawtooth signal into a sawtooth current through the yoke having a linearly increasing middle portion and flattened initial and terminal portions.

6. The vertical deflection system according to claim 5, said second positive feedback circuit including resistance means and capacitance means coupled in series between said input and output electrodes.

7. The vertical deflection system of claim 5 wherein said first positive feedback circuit includes resistance means and capacitance means coupled in series between said output electrode and a point of reference potential, with the junction between said resistance means and said capacitance means being coupled to said input electrode.

8. The vertical deflection system according to claim 7 with said second positive feedback circuit including series connected resistance means and capacitance means coupled in shunt with said resistance means of said first positive feedback circuit.

9. The vertical deflection system according to claim 5, said transistor means including a first transistor having a base electrode corresponding to said input electrode and an emitter electrode, and a second transistor having a base electrode coupled to said emitter electrode of said first transistor, said second transistor having an emitter electrode corresponding to said output electrodes, said load impedance comprising first resistor means coupled from said emitter electrode to a point of reference potential for deriving said parabolic sawtooth signal having attenuated low frequency components thereacross, said first positive feedback circuit including second resistor means and first capacitor means coupled in series between said emitter and said point of reference potential, said second positive feedback circuit including third resistor means and second capacitor means connected in series across said first resistor means, and third capacitor means connected between said base electrode of said first transistor and the junction of said second resistor means and said first capacitor means.

10. The deflection system of claim 5 wherein said transistor means includes a transistor having emitter and collector electrodes, direct current voltage supply means, said circuit means comprising a transformer having a primary winding coupled between said supply means and said collector electrode, said load impedance comprising resistor means coupled between said emitter electrode and a point of reference potential, said transformer having a secondary winding coupled to the vertical deflection yoke.

References Cited

UNITED STATES PATENTS

| | | | |
|---|---|---|---|
| 2,911,566 | 11/1959 | Taylor et al. | 315—27 |
| 3,098,171 | 7/1963 | Ashley | 315—27 |

RODNEY D. BENNETT, Jr., *Primary Examiner.*

C. L. WHITHAM, *Assistant Examiner.*